United States Patent [19]

Shiono et al.

[11] Patent Number: 4,471,383
[45] Date of Patent: Sep. 11, 1984

[54] APPARATUS FOR LOCKING THE IRIS APERTURE OF A CAMERA

[75] Inventors: Ryuji Shiono, Machida; Tadashi Esashika, Kiyokawa, both of Japan

[73] Assignee: Sony Corporation, Tokyo, Japan

[21] Appl. No.: 383,773

[22] Filed: Jun. 1, 1982

[30] Foreign Application Priority Data

Jun. 3, 1981 [JP] Japan .................................. 56-85363

[51] Int. Cl.³ ............................................. H04N 5/26
[52] U.S. Cl. ................................................ 358/228
[58] Field of Search .............................. 358/228, 219

[56] References Cited

U.S. PATENT DOCUMENTS

4,410,915 10/1983 Yamamoto ........................... 358/228

Primary Examiner—John C. Martin
Assistant Examiner—Luan Nguyen
Attorney, Agent, or Firm—Lewis H. Eslinger; Alvin Sinderbrand

[57] ABSTRACT

Apparatus is provided for automatically controlling or locking the iris aperture of a camera. The brightness level of a signal produced by the camera is detected and an automatic control circuit responds to this detected brightness level to energize an iris drive, thereby establishing the iris aperture. The actual size of that aperture is represented by an aperture signal. This aperture signal is used by a control signal generator to generate a control signal corresponding thereto. A selecting circuit is operable to select either an automatic control mode wherein the iris drive is energized by the detected brightness level of the signal produced by the camera, or an iris lock mode wherein the iris drive is energized to maintain the iris aperture at a fixed size irrespective of changes in that brightness level. An iris lock circuit responds to the selection of the iris lock mode for storing the control signal which is generated just prior to the selection of the iris lock mode, and compares the stored control signal to the aperture signal that is produced during the iris lock mode to energize the iris drive as a function of the difference therebetween. In the iris lock mode the automatic control circuitry is disabled. The iris aperture thus is fixed at a size determined by the stored control signal.

25 Claims, 6 Drawing Figures

APPARATUS FOR LOCKING THE IRIS APERTURE OF A CAMERA

BACKGROUND OF THE INVENTION

This invention relates to iris aperture control apparatus and, more particularly, to apparatus which is used either to control the iris aperture automatically as a function of the brightness level of a signal produced by the camera in which the iris is provided, or to maintain the iris aperture at a fixed size irrespective of changes in the brightness level of that signal, without requiring mechanical locking elements.

In photography, image sensing, image recording, and the like, the usual camera or image pick-up device generally is provided with an adjustable iris aperture. The size of the iris aperture determines the amount of light which enters the camera or pick-up device. As the amount of light increases, such as if the brightness of an image increases, the iris aperture should be reduced in size to avoid photographing or sensing an overly bright image. Conversely, if the brightness of the image decreases, the size of the iris aperture should increase.

Typically, in a video camera or image pick-up device, automatic control apparatus is provided for controlling the iris aperture. The brightness of the video signal produced by the camera is detected, and an iris drive mechanism is selectively energized as a function of that detected brightness level. For example, a selectively energizable motor, such as a DC motor, may be used to control the iris aperture, and this motor is controlled as a function of the detected brightness level of the video signal.

In some situations, the camera operator may wish to override the automatic iris control and maintain the iris aperture at a fixed size irrespective of changes in the brightness level of the signal produced by the camera. For example, if the same subject or scene is photographed or imaged for a long period of time, it may be desirable to lock the iris aperture so as to be insensitive to changes in the brightness of the subject. To provide this locking feature, some camera or image pick-up devices are provided with mechanical locking assemblies.

An automatic iris control device may be provided with a selectively energizable motor which is operated to increase or decrease the size of the iris aperture. In one type of locking assembly used therewith, a rubber element, such as a rubber disc, brake, or the like, is inserted into the transmission between the drive motor and the iris so as to prevent the iris from being driven. After several locking operations, however, the rubber device may be deformed and, as a consequence thereof, the reliability of this type of locking assembly may deteriorate over time. Moreover, if the automatic iris control device is of the type which automatically closes the iris when power to the camera or image pick-up device is interrupted, thereby protecting the pick-up screen thereof, such closure of the iris may be inhibited if the rubber element has been inserted to lock the iris at a fixed aperture. To protect the screen, it is necessary to unlock the iris when the camera power is interrupted. This additional control over the locking assembly adds to the complexity of the iris control device.

In another type of automatic iris control device, the aforementioned drive motor is mechanically coupled to the iris by a gear transmission. The iris may be locked to a fixed aperture size merely by meshing the gears to prevent rotation thereof. However, when the gears are brought into meshing engagement, it is highly possible that one of the gears must rotate by a maximum of one-half a tooth due to, for example, backlash. This results in a corresponding change in the iris aperture size. As a result, the actual aperture size at which the iris is locked may differ from the desired size by an amount corresponding to this one-half tooth. Although this deviation in the actual iris aperture size from the desired size thereof may not be readily noticeable when the iris is to be locked at a relatively large or wide aperture, this deviation becomes pronounced when the iris is to be locked at a relatively small aperture, such as when the iris almost is closed. Such a deviation at small iris aperture openings may greatly affect the level of the video signal produced by the video camera or image pick-up device.

OBJECTS OF THE INVENTION

Therefore, it is an object of the present invention to provide improved apparatus for controlling the iris aperture of a camera, and particularly for locking the iris aperture thereof.

Another object of this invention is to provide improved iris aperture control/locking apparatus.

A further object of this invention is to provide improved apparatus for controlling and locking the iris aperture of a camera or image pick-up device which overcomes the aforenoted disadvantages.

An additional object of this invention is to provide electronic locking means for the iris aperture of a camera or image pick-up device.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for controlling the iris aperture of a camera. The brightness level of a signal produced by the camera is detected and used to automatically energize an iris drive device which establishes the iris aperture. An aperture signal representing the actual size of the iris aperture is generated and is used by a control signal generator to generate a control signal. A selector operates to select either an automatic control mode wherein the iris drive is energized in response to the detected brightness level of the camera-produced signal, or an iris lock mode wherein the iris drive is energized to maintain the iris aperture at a fixed size irrespective of changes in the brightness level of the camera-produced signal. When the iris lock mode is selected, an iris lock circuit stores the control signal which was generated just prior to that selection and compares the stored control signal to the aperture signal that is produced during the lock mode to energize the iris drive as a function of the difference therebetween.

In one embodiment, the control signal is produced by a counter which counts pulses supplied thereto, the count being converted to an analog signal which is compared to the aperture signal. When the compared signals are substantially equal, the counter is disabled. The count which the counter had reached is stored in a latch circuit, and it is the latched count which is converted to an analog signal and compared to the aperture signal during the iris lock mode. Prior to the iris lock mode, the counter is inhibited from incrementing its count further when the analog signal corresponding to that count is substantially equal to the aperture signal. The counter is reset periodically, such as at the video field rate, and then permitted to increment once again until the analog signal produced therefrom becomes equal to the aperture signal.

In accordance with another embodiment of this invention, the control signal is produced by an up/down counter whose count is converted to an analog signal which, in turn, is compared to the aperture signal. The counting direction of the up/down counter is controlled as a function of the difference between the analog and aperture signals. The count of the up/down counter thus approximates the aperture signal and, when an iris lock mode is selected, the counter is disabled so as to have the last-reached count "frozen" therein. The iris aperture thus is locked at a size represented by the count stored in the up/down counter.

In accordance with a still further embodiment, the aperture signal is supplied by a switch to a storage capacitor. When the iris lock mode is selected, this switch is opened, and a comparator compares the stored signal to the aperture signal and selectively energizes the iris drive as a function of any difference therebetween. Thus, the iris aperture is locked to the size represented by the stored signal.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
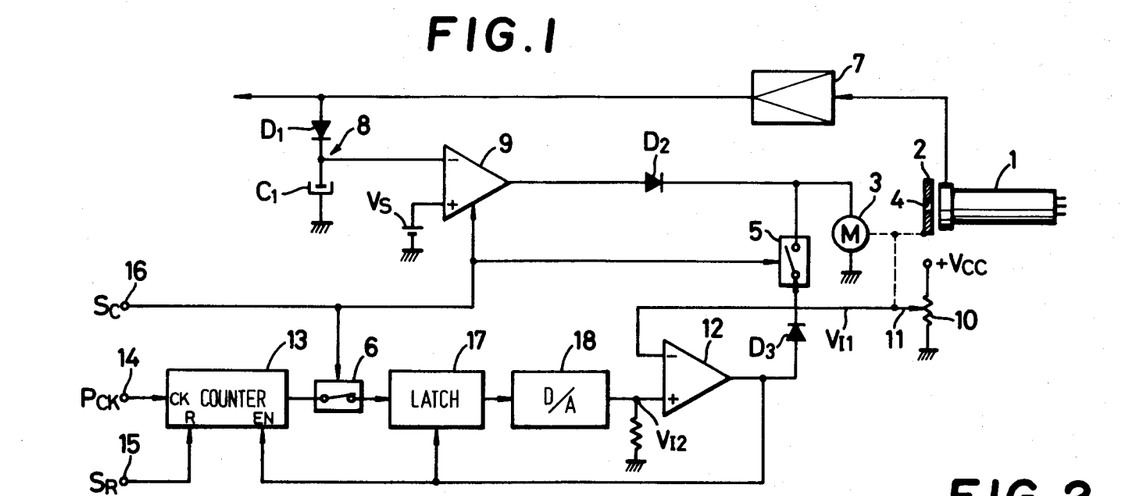
FIG. 1 is a partial block, partial schematic diagram of one embodiment of the present invention.

Referring now to the drawings, wherein like reference numerals are used throughout, and in particular to FIG. 1, there is illustrated one embodiment of the present invention. The iris aperture control arrangement is shown in FIG. 1 as operating in conjunction with a video camera 1. It will be appreciated, however, that the iris aperture control arrangement may be used, if desired, with other cameras, or image pick-up devices. Thus, as used herein, the word "camera" should be recognized as being applicable to video cameras as well as to other camera and image pick-up devices.

Light impinges upon the image pick-up element of camera 1 by passing through an aperture 4 in iris 2. The iris is mechanically coupled to a selectively energizable drive motor 3, such as a DC motor, such that the size of aperture 4 is controlled by the motor. As an example, iris 2 may be of the rotatable type whereby the size of aperture 4 increases when the iris rotates in a first direction, and the size of the aperture decreases when the iris rotates in the opposite direction. Motor 3 is selectively energizable to rotate iris 2 in the first or second directions, respectively.

Motor 3 is supplied with an energizing signal that is produced as a function of the brightness level of the video signal produced by camera 1. To this effect, the video signal produced by the camera is supplied by an amplifier 7 to various processing circuits (not shown) normally provided in video cameras, and also to a detector 8. Detector 8 is comprised of a semi-peak detector having a diode $D_1$ for rectifying the video signal and supplying the rectified signal to a grounded capacitor $C_1$. The time constant of detector 8 is a function of the impedance of diode $D_1$ and the capacitance of $C_1$ and is selected such that the level of the video signal which is intermediate the peak level thereof and the average level thereof is detected and stored on capacitor $C_1$. This detected signal level represents the brightness of the video signal produced by the camera. If the video camera is, for example, a color image pick-up device, the brightness of the video signal is determined by the level of the luminance component, and it is this luminance component which is supplied to detector 8. It is appreciated that the brightness level of the video signal represents the amount of light that is transmitted from a subject through aperture 4 to camera 1. As the amount of this light increases, that is, as the brightness of the subject increases, the size of aperture 4 should be reduced in order to return the video signal, or at least the luminance component thereof, to a desired level. Thus, iris 2 is controlled so as to vary the size of aperture 4 as a function of the amount of light which passes therethrough.

A comparator 9, which may be a differential amplifier, has one input thereof coupled to the junction defined by diode $D_1$ and capacitor $C_1$, and another input thereof coupled to receive a reference voltage $V_S$. Comparator 9 thus compares the detected brightness level of the video signal produced by camera 1, as represented by the voltage across capacitor $C_1$, to reference voltage $V_S$. A diode $D_2$ supplies the difference between the compared signals to motor 5.

It will be recognized that the combination of detector 8 and comparator 9 functions as an automatic control circuit for automatically adjusting the size of aperture 4 of iris 2. As the brightness level of the video signal increases, the detected voltage across capacitor $C_1$ increases, and comparator 9 supplies a control signal to motor 3 to drive the motor in a direction such that aperture 4 is reduced in size. Hence, the amount of light passing through the aperture to camera 1 is correspondingly reduced. Conversely, if the detected brightness level of the video signal decreases, the voltage across capacitor $C_1$ likewise decreases and comparator 9 supplies motor 3 with an energizing signal such that the motor rotates in the opposite direction to increase the size of aperture 4. Hence, the amount of light which passes through the iris to camera 1 is increased.

FIG. 1 also illustrates an iris lock arrangement for locking the iris to maintain the size of its presently existing aperture 4. This arrangement includes an aperture signal generator for generating an aperture signal representing the actual size of aperture 4, a control signal generator for generating a control signal corresponding to this aperture signal and a circuit for controlling motor 3 so as to maintain the size of aperture 4 equal to the size represented by the control signal. More particularly, the aperture signal generator is comprised of a variable voltage device mechanically coupled to iris 2 so as to generate a voltage that is determined by the position of the iris and, thus, the actual size of aperture 4. The variable voltage device is comprised, for example, of a potentiometer 10 supplied with an energizing potential $+V_{cc}$ and having an adjustable element, or slider, 11 mechanically coupled to iris 2. As the position of the iris changes, that is, as aperture 4 increases or decreases, the relative position of slider 11 changes in a similar manner so as to vary the voltage-dividing relationship of potentiometer 10. The divided voltage $V_{I1}$ corresponds to the aperture signal.

The control signal generator is comprised of a comparator 12, a counter 13, a latch circuit 17 and a digital-to-analog (D/A) converter 18. Counter 13 includes a clock input CK coupled to an input terminal 14 to receive clock pulses $P_{CK}$. These clock pulses, also referred to herein as count pulses, are generated by a suitable source which, for example, may be synchronized with the horizontal scanning of the electron beam provided in video camera 1. For example, count pulses $P_{CK}$ may have the usual horizontal repetition rate of 15.75 KHz. The count of counter 13 is incremented in response to each count pulse supplied thereto. The counter also includes a reset terminal R coupled to an input terminal 15 to which reset pulses $S_R$ are supplied. These reset pulses may be synchronized with the usual field repetition rate of a television scan raster. Hence, the reset pulses $S_R$ may exhibit the repetition rate of 60 Hz. The counter also includes an enable input EN which is coupled to the output of comparator 12. As will be described, counter 13 is enabled to count count pulses $P_{CK}$ when an enable signal of, for example, negative polarity is supplied to its enable input EN. When this signal exhibits zero or positive polarity, a disable signal is supplied to input EN to disable counter 13.

The output of counter 13 is coupled, via a switch 6, to latch circuit 17. So long as switch 6 is closed, latch 17 will receive the changing count of counter 13. However, if switch 6 is opened, latch circuit 17 will store therein the last count that had been received from counter 13. The latch circuit also is diagrammatically illustrated as having an input coupled to the output of comparator 12.

D/A converter 18 is coupled to latch circuit 17 and is adapted to convert the digital count signal stored in the latch circuit to a corresponding analog signal level. One embodiment of D/A converter 18 is described hereinbelow with respect to FIG. 1. It is appreciated, therefore, that as the count of counter 13 increases, latch circuit 17 supplies this increasing count to D/A converter 18 which, in turn, supplies a correspondingly increasing analog signal to comparator 12. This analog signal is referred to herein as control signal $V_{I2}$.

Comparator 12 may be similar to comparator 9 and includes two inputs, one of which is coupled to D/A converter 18, as just described, and the other of which is coupled to variable voltage device 10 to receive aperture signal $V_{I1}$. The comparator functions to compare the control signal $V_{I2}$ with the aperture signal $V_{I1}$. In the illustrated embodiment, if the control signal is less than the aperture signal, comparator 12 produces a relatively negative output signal. However, when the control signal is equal to or greater than the aperture signal, the comparator produces a zero or positive output signal, respectively. This output signal is supplied to the enable input EN of counter 13 and also to a switch 5 via a diode $D_3$.

Switches 5 and 6 normally exhibit the states illustrated in FIG. 1. Thus, during normal operation wherein aperture 4 of iris 2 is controlled automatically by the automatic control circuit described above, switch 5 is opened and switch 6 is closed. These switches are schematically illustrated as electromechanical switches and may be comprised of suitable solid-state switching devices known to those of ordinary skill in the art. These switches are provided with control terminals coupled in common to input terminal 16. Terminal 16 is adapted to receive a lock command signal $S_C$ which serves to open switch 6 and close switch 5. The lock command signal $S_C$ also is coupled to comparator 9 and serves to inhibit the operation of this comparator. Switch 5, when closed, couples the output of comparator 12 to motor 3.

Figure 2:
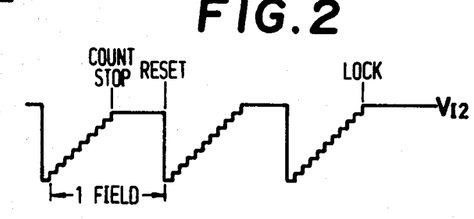
FIG. 2 is a waveform diagram which is useful in understanding the operation of the embodiment shown in FIG. 1.

The operation of the lock control circuitry now will be described. The count of counter 13 is incremented by count pulses $P_{CK}$; and this incrementing count is supplied to D/A converter 18 by latch circuit 17 whereat it is converted to a corresponding analog signal. FIG. 2 represents the step-wise increase in the output of D/A converter 18. Thus, control signal $V_{I2}$ increases in this step-wise manner.

Comparator 12 compares the increasing analog signal supplied thereto to the aperture signal $V_{I1}$ produced by variable voltage device 10. It is appreciated that the aperture signal $V_{I1}$ represents the actual size of aperture 4. At this time, iris 2 is controlled by the automatic aperture control circuitry comprised of detector 8 and comparator 9, as described above.

When the analog control signal $V_{I2}$ increases so as to be equal to the aperture signal $V_{I1}$, comparator 12 produces a disable signal which is supplied to the enable input EN of counter 13. The counter thus is disabled from further incrementing the count thereof, and latch circuit 17 thus supplies a constant digital count signal to D/A converter 18. FIG. 2 illustrates the constant analog control signal $V_{I2}$ which is produced by the D/A converter and which now is equal to the aperture signal $V_{I1}$. The digital count signal is stored in latch circuit 17 until counter 13 is reset or, alternatively, an iris lock mode is selected.

Let it be assumed that the iris lock mode has not been selected. Hence, when the reset pulse $S_R$ is produced, counter 13 is reset to an initial count, such as a count of zero. Latch circuit 17 thus is supplied with this reset count, and the latch circuit, in turn, supplies the D/A converter with that count. Hence, the analog control signal $V_{I2}$ is reset to an initial value, as illustrated in FIG. 2. The foregoing operation then is repeated, whereby counter 13 counts the count pulses $P_{CK}$, and D/A converter 18 converts this count to a corresponding, step-wise analog control signal $V_{I2}$. As shown in FIG. 2, counter 13 is reset at the video field repetition rate (i.e. the vertical synchronizing signal rate); and when the count of counter 13 reaches a value corresponding to the level of the aperture signal $V_{I1}$, comparator 12 disables the counter from further incrementing its count. Hence, the analog control signal $V_{I2}$ is increased in the step-wise manner until it reaches the level equal to the level of the aperture signal $V_{I1}$.

Now, let it be assumed that the lock command signal $S_C$ is supplied to input terminal 16. Preferably, the lock command signal is synchronized with the disable signal produced by comparator 12. For example, a gate circuit may be supplied with the lock command and disable signals to produce an output that is timed with the disable signal. For the purpose of the present discussion, it will be assumed that the lock command signal $S_C$ is so timed. Thus, when the analog control signal $V_{J2}$ is equal to the aperture signal $V_{J1}$, switch 6 opens such that latch circuit 17 now retains the digital count signal that produces this control signal $V_{J2}$. This means that counter 13 may be reset and incremented subsequently, but this operation will not affect the digital count signal now stored in the latch circuit.

The lock command signal $S_C$ also inhibits comparator 9 and closes switch 5. Comparator 12 now compares the control signal $V_{J2}$ to the aperture signal $V_{J1}$. Although the control signal remains fixed, it is possible that the aperture signal may vary as by a variation in the size of aperture 4 of iris 2. If the aperture signal $V_{J1}$ varies so as to differ from the control signal $V_{J2}$, comparator 12 energizes motor 3 via closed switch 5 so as to drive iris 2 in a direction whereby aperture 4 is adjusted to bring the aperture signal $V_{J1}$ into agreement with the control signal $V_{J2}$. Thus, a motor control loop is established whereby motor 3 is controlled to maintain aperture 4 at a fixed size irrespective of changes in the brightness level of the signal produced by camera 1. Hence, the same scene or subject may be imaged without changing the size of aperture 4.

It is seen that the control signal $V_{J2}$ is used in the iris lock mode as a reference signal to which the aperture signal is compared. Of course, this reference signal is equal to the aperture signal that had been produced just prior to the iris lock command. Although the aperture signal $V_{J1}$ may vary, as aforesaid, the stored control signal $V_{J2}$ does not.

At the completion of the iris lock mode, the iris lock command signal $S_C$ terminates so as to open switch 5 and close switch 6 and, moreover, to enable comparator 9 to operate in the manner described above. The illustrated apparatus now carries out the automatic iris control mode, and analog control signal $V_{J2}$ is produced periodically in preparation for the next iris lock mode.

In the embodiment shown in FIG. 1, it is appreciated that comparator 12 is used to disable counter 13 when the analog control signal $V_{J2}$ has increased to be equal to the aperture signal $V_{J1}$ and, in addition, the comparator functions to compare the control and aperture signals during the iris lock mode.

Preferably, switch 6 does not open until comparator 12 disables counter 13. If the switch opens prior to that time, it is possible that the latch circuit may store a digital count signal whose value is less than the value needed for $V_{J2}=V_{J1}$.

In a variation of the embodiment shown in FIG. 1, the digital count signal produced by counter 13 is supplied in parallel to latch circuit 17 and D/A converter 18. Upon the occurrence of the lock command signal $S_C$, this digital count signal is latched in latch circuit 17 and, at that time, the latched digital count signal is supplied to the D/A converter. Suitable switches and/or gate circuits may be provided to implement this modification.

Figure 3:
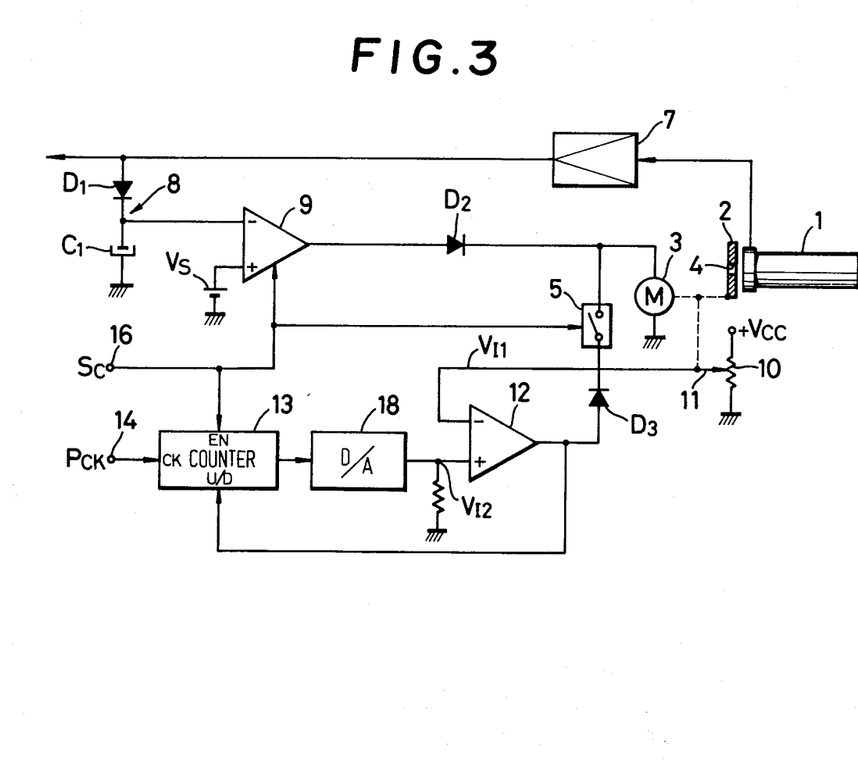
FIG. 3 is a partial block, partial schematic diagram of another embodiment of this invention.

Referring now to FIG. 3, there is illustrated another embodiment of the present invention. This embodiment is similar to that shown in FIG. 1 except that latch circuit 17 is omitted and counter 13 now is illustrated as an up/down counter 13'. The up/down counter is adapted to increment or decrement its count in response to each count pulse $P_{CK}$ supplied thereto via input terminal 14 in response to a direction control signal supplied to its up/down input by comparator 12. Also, up/down counter 13' is enabled in the absence of a lock command signal $S_C$. When a lock command signal is produced, up/down counter 13' is disabled from further counting, and the count then present therein remains as is.

In operation, the instantaneous count of up/down counter 13' is converted to a corresponding analog control signal $V_{J2}$ by D/A converter 18. During the automatic iris control mode, comparator 12 compares this control signal $V_{J2}$ to the aperture signal $V_{J1}$. When the control signal is less than the aperture signal, comparator 12 supplies an UP count signal to counter 13', whereby the counter counts count pulses $P_{CK}$ in the upward direction. When the count of counter 13' has been incremented such that the corresponding analog control signal $V_{J2}$ now exceeds the aperture signal $V_{J1}$, comparator 12 supplies a DOWN count signal to up/down counter 13'. Now, the count of counter 13' is decremented in response to each count pulse $P_{CK}$. Hence, the analog control signal $V_{J2}$ likewise is reduced. When this control signal is less than the aperture signal, comparator 12 supplies the UP count signal to up/down counter 13' once again. Thus, it is seen that the count of counter 13' fluctuates, or "hunts" about a level whose value is equal to the value of the aperture signal $V_{J1}$. Accordingly, the level of control signal $V_{J2}$ likewise fluctuates, or hunts, about this aperture signal level.

When the lock command signal $S_C$ is produced, counter 13' is disabled. Accordingly, the last-attained count is stored therein, and this count is converted by D/A converter 18 to the corresponding analog control signal $V_{J2}$. It is seen that this control signal is approximately equal to the aperture signal $V_{J1}$.

Comparator 12 now controls motor 3 via switch 5 (which had been closed in response to the lock command signal) so as to maintain aperture 4 at the size fixed by the control signal. It is appreciated that the count stored in counter 13' represents the iris aperture size that is substantially equal to the actual iris aperture size at the time that the lock command signal had been produced.

In the embodiment shown in FIG. 3, the camera operator may find it desirable to effect minor adjustments in the size of aperture 4 even when iris 2 is locked. This may be achieved by selectively enabling counter 13' for a limited duration such that its count is incremented or decremented, as desired, by count pulses $P_{CK}$. This change in the count of counter 13' results in a corresponding change in the control signal $V_{J2}$, thereby driving motor 3 so as to effect a similar change in the size of aperture 4.

Figure 4:
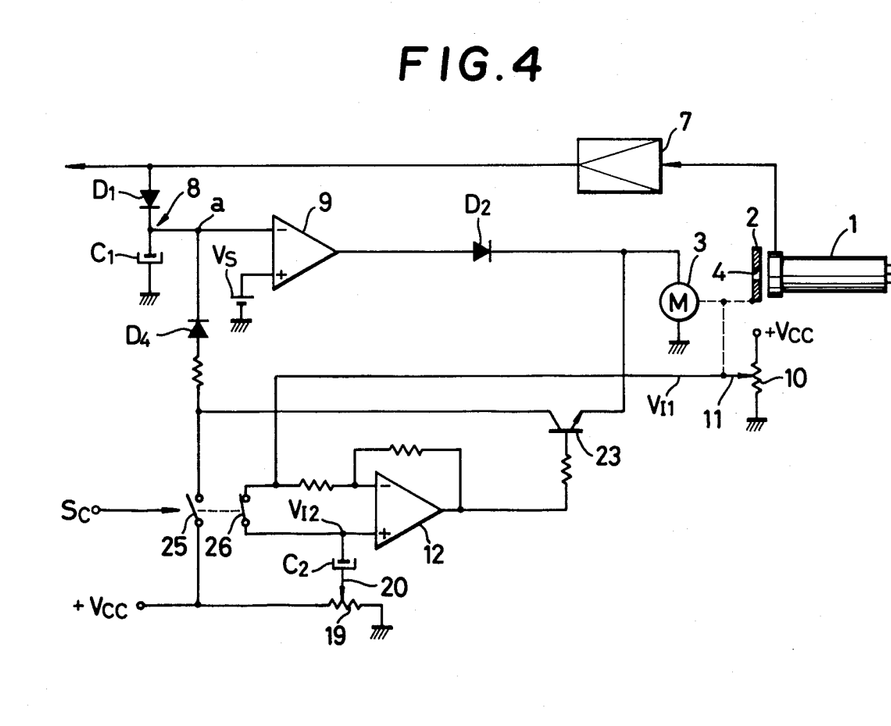
FIG. 4 is a schematic diagram of a still further embodiment of this invention.

In the embodiments shown in FIGS. 1 and 3, the iris lock control circuitry is implemented by digital techniques. An analog implementation of another embodiment of the lock control circuitry is illustrated in FIG. 4. The lock control circuitry is comprised herein of a storage capacitor $C_2$ coupled via a normally closed switch 26 to variable voltage device 10 to receive and store the aperture signal $V_{J1}$. Switch 26 also serves to provide a low impedance, or short-circuit, connection between the respective inputs of comparator 12. The output of this comparator is coupled by an emitter-follower transistor 23 to motor 3. Another switch 25, ganged with switch 26, is normally open and is adapted to apply an energizing potential supplied from a suitable source $+V_{cc}$ via a diode $D_4$ to, for example, the inverting input of comparator 9. Switch 25 also couples the energizing potential to the collector electrode of emitter-follower transistor 23.

During the automatic iris control mode, detector 8 and comparator 9 function in the manner described above so as to energize motor 3 for controlling the size of aperture 4 as a function of the brightness level of the video signal produced by camera 1. Aperture signal $V_{I1}$, which represents the actual size of aperture 4, is supplied via closed switch 26 to storage capacitor $C_2$. Hence, this capacitor is charged to produce the control signal $V_{I2}$, wherein $V_{I2}=V_{I1}$. At this time, comparator 12 is inhibited by reason of closed switch 26. Also, switch 25 is opened so as to inhibit emitter-follower transistor 23.

When the iris lock mode is selected, as by producing the lock command signal $S_C$, switch 25 closes and switch 26 opens. Operating potential $+V_{cc}$ now is supplied to point a via diode $D_4$. It is assumed that the voltage now supplied to point a exceeds the reference voltage $V_S$ and, therefore, diode $D_2$ blocks any output from comparator 9 from being supplied to motor 3. Stated otherwise, the closing of switch 25 serves to effectively inhibit the operation of comparator 9. Also, when switch 25 is closed, the energizing potential $+V_{cc}$ is supplied to the collector electrode of emitter-follower transistor 23. This emitter-follower thus is enabled to supply the signal applied to the base electrode thereof to motor 3.

When switch 26 opens, the signal which had been supplied to storage capacitor $C_2$ now remains thereacross. Thus, the storage capacitor remains charged to the control signal $V_{I2}=V_{I1}$. Furthermore, the opening of switch 26 serves to remove the short-circuit across the inputs of comparator 12. The comparator thus is enabled to compare the control signal $V_{I2}$ stored across capacitor $C_2$ to aperture signal $V_{I1}$. Any difference between these compared signals results in an output from comparator 12 that is supplied by emitter-follower transistor 23 to motor 3. The motor thus is driven in a direction to adjust the size of aperture 4 such that the relationship $V_{I2}=V_{I1}$ is restored and maintained. Thus, iris 2 is locked to maintain aperture 4 at the size represented by aperture signal $V_{I1}$ immediately prior to the occurrence of the lock command signal.

In implementing the embodiment shown in FIG. 4, comparator 12 may comprise a differential amplifier having a resistor connected to the inverting input thereof and a feedback resistor also connected to the inverting input thereof to establish a desired gain. Preferably, this differential amplifier includes an input stage having an FET of sufficiently high impedance so as to minimize leakage of the control signal $V_{I2}$ from capacitor $C_2$. Advantageously, capacitor $C_2$ exhibits only a small leakage current. Consequently, control signal $V_{I2}$ may be stored across capacitor $C_2$ for a substantial period of time, for example, for about one hour.

One plate of capacitor $C_2$ is illustrated as being connected to the non-inverting input of comparator 12, and the other plate thereof is illustrated as being coupled to the adjusting element 20 of potentiometer 19. It is recognized that potentiometer 19 is coupled between the source of energizing potential $+V_{cc}$ and ground. Hence, the potentiometer supplies a voltage to the plate of capacitor $C_2$ coupled thereto as a function of the setting of adjustable element 20. If the voltage supplied to this plate of capacitor $C_2$ is adjusted, a corresponding adjustment is effected in control signal $V_{I2}$. Hence, even when the iris lock mode is selected, the camera operator may adjust the size of aperture 4 by adjusting potentiometer 19. It is appreciated that this adjustment results in a change in control signal $V_{I2}$, whereby motor 3 is energized from comparator 12 to drive iris 2 in a direction whereby the aperture signal $V_{I1}$ becomes equal to the control signal $V_{I2}$. Thus, manual adjustments in the locked iris aperture may be effected.

Figure 5:
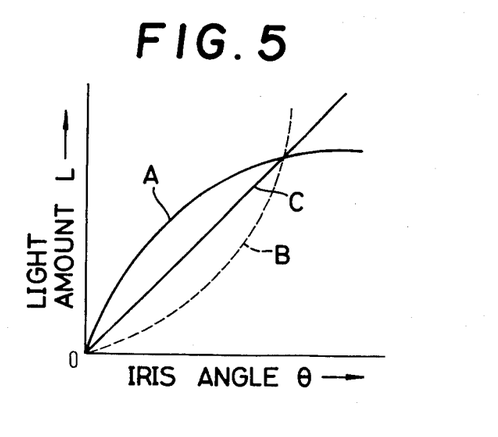
FIG. 5 is a graphical representation of the relationship between the size of the iris aperture and the amount of light which is detected as passing through the iris aperture.

In the foregoing embodiment, it is desirable to adjust iris 2 linearly with respect to the brightness of the video signal produced by camera 1. That is, it is desirable to provide a linear relationship between the amount of light incident on camera 1 through aperture 4 and the size of that aperture. However, the actual relationship between the amount of incident light which passes through the aperture and the size of that aperture generally is not linear. FIG. 5 graphically depicts, by curve A, the non-linear relationship between the amount of incident light and the size of the aperture. For convenience, this aperture size is referred to as the angle $\theta$ of the iris. As this angle increases, the size of the aperture also increases and the amount of light which passes therethrough likewise increases. However, as shown by curve A, this relationship clearly is non-linear. Because of this non-linear relationship, it may be difficult to lock the iris at the desired aperture during the iris lock mode.

In order to overcome this non-linear relationship between the amount of incident light and the size of the aperture, a circuit having a complementary non-linear relationship represented by curve B is used. For example, if D/A converter 18 in the embodiments shown in FIGS. 1 and 3 exhibits the non-linear conversion relationship represented by curve B, then the circuitry will operate with the linear light vs. aperture relationship represented by curve C. This means that the control signal $V_{I2}$, and also the aperture signal $V_{I1}$, will be interpreted as being linear with the amount of incident light.

Figure 6:
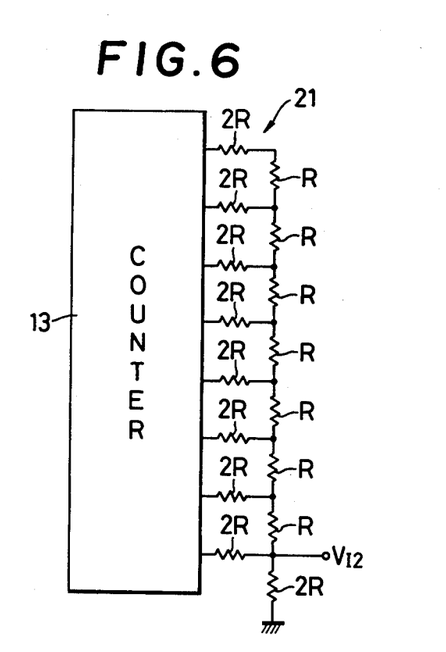
FIG. 6 is a schematic diagram of a digital-to-analog converter which can be used with the present invention.

FIG. 6 is a schematic diagram of a ladder network 21 which may be used in D/A converter 18. In FIG. 6 ladder network 21 is illustrated as being coupled to an 8-bit counter, each bit being supplied through a resistor having resistance value 2R to a respective junction of a voltage divider circuit. The resistor of this voltage divider circuit which interconnects the outputs from two adjacent bits exhibits the resistance value R, and a final resistor of resistance value 2R is connected from this ladder network to ground. Depending upon the particular resistance values which are selected, the output analog control signal $V_{I2}$ derived therefrom will exhibit the linear relationship with respect to the amount of incident light as depicted by curve C in FIG. 5. Hence, as the count of counter 13 changes, the analog control signal $V_{I2}$ likewise changes to represent an aperture size that varies linearly with light, in accordance with the curve C.

Although the embodiment shown in FIG. 6 represents the digital count signal produced by counter 13 as being supplied to ladder network 21, it will be appreciated that the ladder network may be supplied with the digital count signal stored in latch circuit 17 (the FIG. 1 embodiment) or the up/down counter 13' (the FIG. 3 embodiment).

The embodiment shown in FIG. 4 may exhibit the linear light vs. aperture relationship depicted by curve C in FIG. 5 if potentiometer 19 is a non-linear resistance. For example, if potentiometer 19 exhibits a non-linear resistance having a characteristic curve similar to curve B shown in FIG. 5, then the embodiment of FIG. 4 will permit manual adjustments in aperture 4 having a linear light vs. aperture relationship.

While the present invention has been particularly shown and described with reference to certain preferred embodiments, it will be readily appreciated by those of ordinary skill in the art that various changes and modifications in form and details may be made without departing from the spirit and scope of the invention. For example, in the foregoing embodiments, it has been assumed that iris 2 is mechanically driven by a motor. Such an iris may be a mechanical iris shutter. Alternatively, an electronic iris shutter arrangement, such as a deflection grid, may be used. In that event, the output of comparators 9 and 12 are selectively coupled to the electronic shutter to control the effective aperture therein.

Also, aperture signal $V_{fl}$ has been described as being produced by a variable voltage device such as a potentiometer. Alternatively, other variable voltage devices may be used, such as a magnetoresistive device, a photo-coupled device, or the like. These devices produce a variable aperture signal as a function of the position or setting, or actual aperture size, of iris 2.

Still further, video camera 1 may be provided with an electronic image pick-up tube, a semiconductor photodetector, a CCD image sensor, or the like. As a further alternative, camera 1 need not be limited solely to video cameras but, alternatively, may be a photographic camera or other suitable imaging device.

It is intended that the appended claims be interpreted as including the foregoing as well as various other changes and modifications.

What is claimed is:

1. Apparatus for controlling the iris aperture of a camera, comprising drive means selectively energizable for establishing said iris aperture; detecting means coupled to said camera for detecting the brightness level of a signal produced by said camera; automatic control means coupled to said iris drive means and responsive to the detected brightness level of said signal for energizing said iris drive means; aperture signal generating means for generating an aperture signal representing the actual size of said iris aperture; control signal generating means coupled to receive said aperture signal and to generate a control signal corresponding to said aperture signal; selecting means operable to select an automatic control mode wherein said iris drive means is energized in response to said detected brightness level of the signal produced by said camera and an iris lock mode wherein said iris drive means is energized to maintain said iris aperture at a fixed size irrespective of changes in the brightness level of the signal produced by said camera; and iris lock means responsive to the selection of said iris lock mode for storing the control signal generated just prior to the selection of said iris lock mode and for comparing the stored control signal to said aperture signal to energize said iris drive means as a function of the difference therebetween.

2. The apparatus of claim 1 wherein said control signal generating means comprises a source of count pulses; counting means for counting said count pulses to produce a digital count signal; digital-to-analog converting means for converting said digital count signal to a corresponding analog signal; and comparator means for comparing said analog signal to said aperture signal and for disabling said counting means when said analog signal is substantially equal to said aperture signal, whereby said analog signal is utilized as said control signal.

3. The apparatus of claim 2 wherein said iris lock means comprises latch means coupled to said counting means for storing said digital count signal when said iris lock mode is selected and for supplying the stored digital count signal to said digital-to-analog converting means; and further including said comparator means whose output is coupled to said iris drive means when said iris lock mode is selected.

4. The apparatus of claim 3 wherein said selecting means is operable to select said iris lock mode at a time following the disabling of said counting means, whereby said latch means stores the maximum digital count signal that had been attained by said counting means.

5. The apparatus of claim 4 wherein said selecting means includes switch means for selectively coupling the output of said comparator means to said iris drive means when said iris lock mode is selected.

6. The apparatus of claim 1 wherein said control signal generating means comprises a source of count pulses; counting means for counting said count pulses to produce a digital count signal representing an iris aperture size; and count control means for controlling said counting means to produce a digital count signal that represents an iris aperture size substantially equal to the actual iris aperture size.

7. The apparatus of claim 6 wherein said counting means comprises an up/down counter, and said count control means controls the counting direction of said up/down counter.

8. The apparatus of claim 7 wherein said count control means comprises digital-to-analog converting means coupled to said counting means for converting said digital count signal to a corresponding analog signal; and comparator means for comparing said analog signal to said aperture signal to control the counting direction of said counting means as a function of the difference therebetween, whereby said analog signal is controlled to be substantially equal to said aperture signal.

9. The apparatus of claim 8 wherein said iris lock means includes said up/down counter, the latter being coupled to said selecting means to be disabled from counting said count pulses when said iris lock mode is selected, and further including said comparator means whose output is coupled to said iris drive means when said iris lock mode is selected.

10. The apparatus of claim 1 wherein said control signal generating means comprises storage means coupled to receive and store said aperture signal.

11. The apparatus of claim 10 wherein said storage means includes a storage capacitor.

12. The apparatus of claim 11 wherein said iris lock means comprises switch means for supplying said aperture signal to said storage capacitor when said automatic control mode is selected and for interrupting the supply of said aperture signal to said storage capacitor when said iris lock mode is selected; and comparator means operable when said iris lock mode is selected to compare said aperture signal to the signal stored on said storage capacitor and to supply the difference therebetween to said iris drive means.

13. The apparatus of claim 12 wherein said comparator means comprises differential amplifier means having two inputs coupled to said aperture signal generating means and said storage capacitor, respectively, and an output coupled to said iris drive means; and wherein said switch means is coupled between said two inputs to provide a low impedance path therebetween when said automatic control mode is selected.

14. The apparatus of claim 12 further comprising emitter follower means coupled to said comparator means for supplying the difference between said aperture signal and the signal stored on said storage capacitor to said iris drive means.

15. The apparatus of claim 14 wherein said selecting means comprises means for supplying an operating potential to said emitter follower means when said iris lock mode is selected.

16. The apparatus of claim 1 wherein said iris drive means comprises a drive motor.

17. The apparatus of claim 1 wherein said detecting means comprises semi-peak level detecting means having a time constant such that a level intermediate the peak and average levels of the signal produced by said camera is produced.

18. The apparatus of claim 1 wherein said aperture signal generating means comprises variable voltage generating means mechanically coupled to said iris drive means for generating a voltage which varies as a function of the iris aperture established by said iris drive means.

19. The apparatus of claim 18 wherein said variable voltage generating means comprises a potentiometer whose setting is varied by said iris drive means.

20. The apparatus of claim 1 wherein said automatic control means comprises a source of reference signal; and comparator means for comparing the detected brightness level of the signal produced by said camera to said reference voltage and for energizing said iris drive means as a function of the difference therebetween.

21. Apparatus for controlling the iris aperture of a video image pick-up device, comprising iris drive means selectively energizable for establishing said iris aperture; detecting means coupled to said image pick-up device for detecting the brightness level of the video signal produced by said image pick-up device; automatic control means coupled to said iris drive means and responsive to the detected brightness level for energizing said iris drive means; aperture signal generating means for generating an aperture signal representing the actual size of said iris aperture; a source of count pulses; counting means for counting said count pulses; digital-to-analog converting means for converting the count of said counting means to a corresponding analog signal; comparator means for comparing said analog signal to said aperture signal to disable said counting means when the compared signals are substantially equal; latch means coupled to said counting means for supplying the count of said counting means to said digital-to-analog converter means; reset means for resetting said counting means at a video field repetition rate; switch means having a first condition to couple the output of said counting means to said latch means and to disconnect the output of said comparator means from said iris drive means, and a second condition to disconnect said latch means from said counting means and to couple the output of said comparator means to said iris drive means; and change-over means timed with the disabling of said counting means to change over said switch means from the first condition thereof to said second condition to lock said iris aperture at a size represented by the count then present in said latch means.

22. Apparatus for controlling the iris aperture of a video image pick-up device, comprising iris drive means selectively energizable for establishing said iris aperture; detecting means coupled to said image pick-up device for detecting the brightness level of the video signal produced by said image pick-up device; automatic control means coupled to said iris drive means and responsive to the detected brightness level for energizing said iris drive means; aperture signal generating means for generating an aperture signal representing the actual size of said iris aperture; a source of counting pulses; up/down counting means for counting said count pulses; digital-to-analog converting means for converting the count of said up/down counting means to a corresponding analog signal; comparator means for comparing said analog signal to said aperture signal to control the counting direction of said up/down counting means so as to minimize the difference between said analog and aperture signals; switch means having a first condition to disconnect the output of said comparator means from said iris drive means and a second condition to connect said output of said comparator means to said iris drive means; and change-over means selectively operable to change over said switch means from the first condition thereof to said second condition and to inhibit said counting means so as to lock said iris aperture at a size represented by the count then reached by said up/down counting means.

23. The apparatus of claim 22 further comprising means for selectively changing the count of the inhibited counting means to correspondingly change the iris aperture.

24. Apparatus for controlling the iris aperture of a video image pick-up device, comprising iris drive means selectively energizable for establishing said iris aperture; detecting means coupled to said image pick-up device for detecting the brightness level of the video signal produced by said image pick-up device; automatic control means coupled to said iris drive means and responsive to the detected brightness level for energizing said iris drive means; aperature signal generating means for generating an aperture signal representing the actual size of said iris aperture; a storage capacitor for storing said aperture signal; comparator means having a first input coupled to said aperture signal generating means and a second input coupled to said storage capacitor; means selectively operable for supplying the output of said comparator means to said iris drive means; switch means having a first condition to interconnect the first and second inputs of said comparator means and supply said aperture signal to said storage capacitor therethrough and to deactuate said means for supplying, and a second condition to disconnect said first and second inputs of said comparator and actuate said means for supplying; and change-over means to change over said switch means from said first condition thereof to said second condition to lock said iris aperture at a size represented by the signal stored on said storage capacitor.

25. The apparatus of claim 24 further comprising means for selectively changing the voltage stored on said storage capacitor to correspondingly change the iris aperture.

* * * * *